No. 886,351. PATENTED MAY 5, 1908.
J. E. CRAWFORD.
AUTOMATIC SNAP FOR GLASSWARE FINISHING.
APPLICATION FILED MAR. 7, 1907.
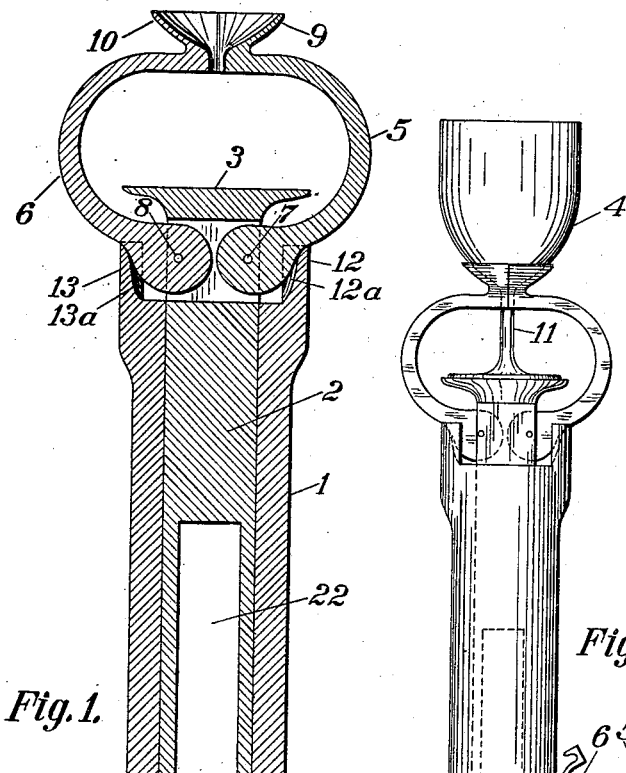
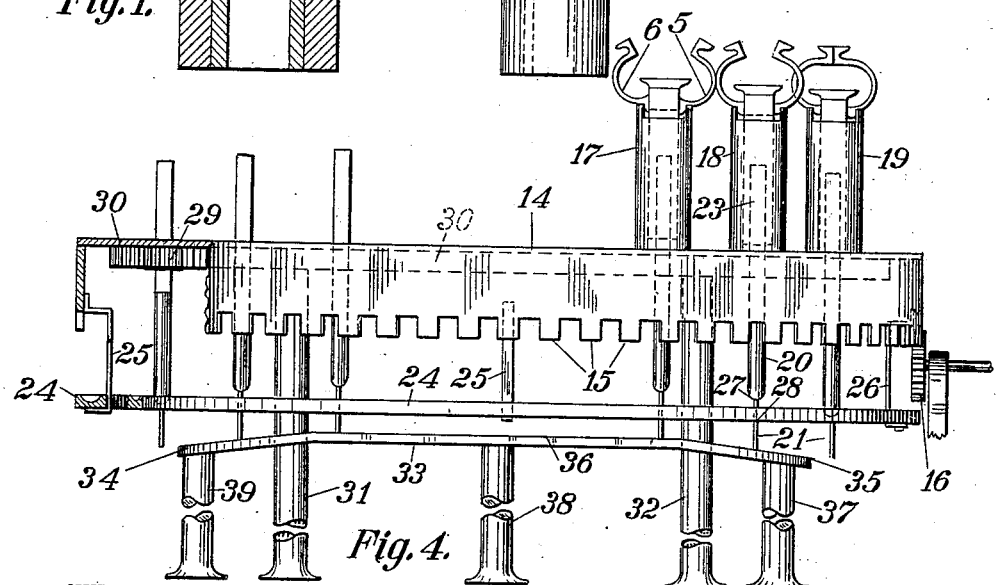
WITNESSES:
INVENTOR.
John E. Crawford,
BY
ATTORNEY.

UNITED STATES PATENT OFFICE.

JOHN E. CRAWFORD, OF COLUMBUS, OHIO.

AUTOMATIC SNAP FOR GLASSWARE-FINISHING.

No. 886,351. Specification of Letters Patent. Patented May 5, 1908.

Application filed March 7, 1907. Serial No. 361,135.

*To all whom it may concern:*

Be it known that I, JOHN E. CRAWFORD, a citizen of the United States, residing at Columbus, in the county of Franklin and State of Ohio, have invented certain new and useful Improvements in Automatic Snaps for Glassware-Finishing, of which the following is a specification.

My invention relates to improvements in automatic snaps for use especially in finishing glassware, and comprises the provision of glass holding arms which are adapted to be opened at a predetermined point, and a glass holding shelf which is adapted to be raised and lowered, said movements opening or closing the arms; the arms are adapted to embrace the stem of a glass vessel placed upon said shelf, and to form a support for the bowl of the glass vessel. The shelf and arms are so mounted upon the revolving table or merry-go-round usually employed in this art, that a constant rotation thereof is maintained, and they are adapted to hold the glass securely in position as the merry-go-round is making a revolution, but as a particular glass vessel is approaching the position of the attendant or operator, means are provided for opening the arms, thereby rendering it easy to remove the glass vessel and substitute another while the motion of the merry-go-round continues.

With this and other objects in view I provide the parts and their combinations which are shown in the drawings and which will be more specifically described hereinafter and embodied in the claims.

Referring to the drawings, which are hereto attached and are hereby made a part of this specification, Figure 1 is a vertical sectional view of my automatic snap, Fig. 2 is a side view of the snap with a glass vessel in place, Fig. 3 is a side view of the snap with the arms open, Fig. 4 is a conventional merry-go-round with several snaps in place, showing the means of operating the merry-go-round and means for actuating the snap.

In the drawings, 1 is a tubular member into which the stem 2 is placed, the latter being preferably squared, so that the tubular member and the stem will rotate together; at its upper end and preferably below the shelf 3, are mounted arms 5 and 6, pivoted to said stem at the points 7 and 8. The arms are curved to meet near their inner and outer ends, and at their outer ends contain the flared portions 9 and 10, which are adapted to embrace the stem 11 of the glass vessel 4 and also to support the bowl of said vessel from beneath, as clearly appears in Fig. 2. The tubular member 1 adjacent its upper end is provided with the standards 12 and 13; as shown in Fig. 1, the arms 5 and 6 near their pivoted ends, engage said standards, and when the stem 2 is in its lowered position, the engagement of the standards and the arms will close the latter, as is also shown in Fig. 2. But if the stem 2 be moved outwardly, the arms, being pivoted will of their own weight, fall outwardly and thereby maintain their engagement with the said standards until the stem 2 is moved beyond a certain point, whereupon the arms will be lifted entirely out of engagement with the standards. However, so long as the snap is kept in operative position, there will be no occasion for moving the stem outwardly farther than to permit the arms to reach the limit of their separation as shown in Fig. 3, and therefore, in practice, the engagement between the arms and the standards would always be maintained.

The standards 12 and 13 are preferably channeled as shown at 12ª and 13ª to receive the arms 5 and 6 and thereby prevent the latter from wabbling or moving sidewise and thereby failing to meet properly around the stem and beneath the bowl of the glass vessel.

The principle of my automatic snap is therefore easily understood, inasmuch as the arms being formed with an outward curve, and being pivoted at their inner ends to the stem, will fall apart of their own weight when released from engagement with the standards, and to make an operative device it remains only to provide means for opening said arms at the desired point, and I have shown such means conventionally in Fig. 4. Referring to the latter figure, 14 is a platform pivotally mounted and provided with the rack 15 with which meshes the pinion 16 which may be driven in any preferred manner; by this construction a rotary motion is imparted to the platform 14. Mounted upon this platform at desired intervals are snaps shown at 17, 18 and 19, it being understood that as many snaps as the circumference of the platform will permit may be provided. The snaps are mounted upon the platform by means of the spindles 20 preferably reduced at their lower ends as shown at 21; the stem 2 is hollowed as shown at 22, and the hollowed portion is adapted to receive the upper end of the spindle 20, said upper portion being squared, as shown at 23 to cause said stem to rotate therewith.

24 is an oil trough suspended from the table 14 by means of appropriate straps 25 and 26, and therefore adapted to rotate with said table; the lower ends of the spindles 20 are rounded as shown at 27 to adapt them to the trough, and an opening through the bottom of the trough, as shown at 28, is provided, through which the reduced portion of the spindle 20 passes. At the left of Fig. 4 is shown a section of the trough and its supporting means and the means for rotating the spindle 20; carried by the spindle 20 is the pinion 29 adapted to mesh with the rack 30 which is mounted upon supports 31 and 32 and which is therefore stationary. The rack is arranged beneath the platform 14 and at a proper distance from the position of the spindles thereon to permit the pinion 29 to mesh therewith; as the platform is rotated the spindles will be given a rapid rotation by means of the construction just described, and consequently the snaps are rotated with the same speed. The purpose of the rotation is to present all portions of the glass vessel to the heat, it being understood that the platform at one side extends through a glory hole into a furnace, and the rotation of the glass vessel assures a proper distribution of heat upon its surface, as it is carried through the furnace by the rotation of the platform 14, whereby any irregularities that may exist thereon may be melted down and the surface will be rendered smooth.

The heat to which the glass is subjected is intense and the slender stem of the glass vessel would ordinarily be so heated as to bend or collapse beneath the weight of the bowl; it therefore becomes necessary to provide a support for the bowl to hold it at the proper elevation so that the excessive heat will not cause the bending of the stem, and this is one of the functions performed by the arms hereinbefore described.

To open the snap when the same is mounted upon the rotating platform, I provide the plate 33 having the cam surfaces 34 and 35 and the horizontal surface 36, in the path of the moving spindles, the plate 33 being supported at 37, 38 and 39. Suppose that the platform 14 is being rotated clockwise; the snap 17 has passed over the cam surface 35 and the spindle has been lifted thereby, consequently raising the stem 2 which permits the arms 5 and 6 to open, whereupon the glass vessel may readily be removed and another may be placed thereon before the spindle has been carried to the second cam face 34. In passing over the latter the spindle is gradually lowered, and after the contact with the said face 34 has ceased the spindle has reached its lower position and the arm is therefore closed around the stem and bowl of the glass vessel. The beginning of the opening movement of the arm is shown in snap 18, while the snap 19 is shown with the arms closed, the position which they will occupy at all points of the revolution of the platform except those at which the reduced portion 21 is in sliding contact with the plate 33.

From the foregoing description it is apparent that I provide a snap which will be operated automatically to receive and release a glass vessel, and which provides a secure positioning of the glass vessel during its movement on the merry-go-round, and which also sustains the weight of the bowl of the glass vessel when the slender stem, on account of the great heat to which the vessel is subjected, would be unable to bear up under the weight of the bowl, it being clear that any bending of the stem would destroy the glass vessel. The attendant or operator will take up his position in front of the plate 33, so that he may take off the glass vessel as soon as the arms have opened sufficiently, and may put on another while the snap is sliding along the surface 36, before the arms have closed. The cam surfaces 34 and 35 slope gradually and the sliding engagement of the spindle therewith will not jar the glass vessel out of position upon the stem.

Having described my invention what I claim as new and desire to secure by Letters Patent is:

1. A snap for glassware finishing comprising a tubular member, standards adjacent its outer end, a reciprocating stem adapted to be received into said tubular member, arms carried pivotally upon said stem adjacent its outer end and adapted to be supported from beneath by said standards, said stem being adapted to receive a glass vessel thereon, the latter being engaged by said arms, and automatic means for elevating said stem whereupon said arms are released from engagement with the glass vessel.

2. A snap for glassware finishing comprising a stem mounted for vertical reciprocation and adapted to receive a glass vessel upon its upper end, arms pivotally mounted upon said stem and adapted to engage said glass vessel to maintain the latter in position, said arms being free to swing apart through gravity, means for supporting said arms from beneath in engagement with said glass vessel, automatic means for releasing said arms from said vessel, and means for returning said arms automatically to their engaging position.

3. A snap for glassware finishing comprising a tubular member, a stem mounted slidably therein and adapted to support a glass vessel upon its outer end, arms pivoted upon said stem for engaging said glass vessel, means carried by said tubular member for maintaining said arms in engagement with said glass vessel, means for sliding said stem outwardly whereupon said arms by gravity are released from said glass vessel, said stem being adapted by gravity to slide inwardly in said tubular member, whereupon said arms are returned to their engaging position.

4. A snap for glassware finishing comprising a tubular member, standards thereon, a stem slidably mounted in said tubular member and adapted to support a glass vessel thereon, reversely curved arms pivoted upon said stem and constructed at their outer ends to engage a glass vessel from beneath the bowl thereof to support the same, said arms being held in engagement with said glass vessel by means of said standards, a spindle engaging said stem adjacent its inner end, and means for giving said spindle an outward movement, whereupon said stem is moved outwardly and said arms through gravity are released from engagement with said glass vessel.

5. A device for glassware finishing comprising a platform rotatably mounted, a tubular member mounted thereon, a stem carried by said member, arms pivoted adjacent the outer end of said stem and held in closed position by engagement with said tubular member, a spindle adapted to support said stem upon its upper end, means for supporting such spindle adjacent its lower end, means for imparting a rotary motion to said platform, and stationary cam means adapted to give said spindle an upward movement, whereupon said arms through gravity swing upon their pivots outwardly away from each other.

6. An automatic snap for glassware finishing comprising a tubular member mounted upon a rotatable platform, standards adjacent the outer end of said member, a stem slidably mounted within said tubular member, said stem being hollowed at its inner end, a spindle adapted to be received into said hollowed portion of said stem, reversely curved arms pivotally mounted upon said stem adjacent its outer end, a glass vessel adapted to be supported on said stem, said arms being constructed to embrace said vessel and to give support thereto and to secure the same in position upon said stem, said arms being maintained in their engaging position by said standards when said stem is in its inner position, and means for causing said spindle to be moved upwardly, whereby said stem is lifted and said arms are released from engagement with said glass vessel.

In testimony whereof I affix my signature in the presence of two witnesses.

JOHN E. CRAWFORD.

Witnesses:
   Geo. C. Crawford,
   Otto H. Magly.